SOLID STATE STORAGE PANEL FOR COLOR REPRODUCTION

Filed Sept. 29, 1966 2 Sheets-Sheet 1

INVENTOR.
BENJAMIN KAZAN
BERND ROSS
BY
Ronald Zibelli
ATTORNEY

Sept. 29, 1970 B. KAZAN 3,531,648

SOLID STATE STORAGE PANEL FOR COLOR REPRODUCTION

Filed Sept. 29, 1966 2 Sheets-Sheet 2

INVENTOR.
BENJAMIN KAZAN
BREND ROSS
BY
Ronald Zibelli
ATTORNEY

United States Patent Office 3,531,648
Patented Sept. 29, 1970

3,531,648
SOLID STATE STORAGE PANEL FOR COLOR REPRODUCTION

Benjamin Kazan, Pasadena, and Bernd Ross, Arcadia, Calif., assignors to Xerox Corporation, Rochester, N.Y., a corporation of New York Filed Sept. 29, 1966, Ser. No. 582,910
Int. Cl. H01l *17/00*
U.S. Cl. 250—213 24 Claims

ABSTRACT OF THE DISCLOSURE

This application relates to a solid state storage panel for color reproduction wherein each of a plurality of electrodes are in contact with at least two segments of electroluminescent material, each of which emit primary radiation in different portions of the electromagnetic spectrum. A layer of variable impedance material overlies the segmented electroluminescent material and is utilized to control the output obtained from the panel.

This invention relates to electroluminescent devices, and in particular, this invention relates to an electroluminescent device of the storage type, wherein an input image is visibly produced, in an intensified or amplified manner, and in which the input image is stored for any selected period of time. More particularly, the present invention relates to such a storage device wherein a color input image is visibly produced having the same color distribution as the original, as well as the intensity of the original image being amplified.

At the present, a variety of solid state imaging devices are known, the storage action of these devices depending on one of several different phenomenon including the slow decay of conductivity after excitation of a photoconductive material, the hysteresis effect in photoconductors and optical feed-back.

One type of solid state imaging device involves a display panel consisting of a layer of photoconductive material in series with a layer of electroluminescent material as described in the patents to Benjamin Kazan U.S. 2,768,310 issued Oct. 23, 1956 and U.S. 2,949,537 issued Aug. 16, 1960. As described therein, the image is produced by the increase in conductivity of the portions of the photoconductive material against which incident radiation impinges. Such conductivity increase produces a corresponding luminescence in the adjoining portion of the electroluminescent material.

A further type of solid state imaging device is the hysteresis-type photoconductor panel wherein an electric field is simultaneously applied to the photoconductive material. In this arrangement, the photoconductive material becomes conducting when exposed to a small amount of light, the conductivity remaining at an almost constant level for substantial periods of time instead of gradually decaying after excitation. In copending application Ser. No. 582,856 filed Sept. 29, 1966, a continuation-in-part application of Ser. No. 514,860, filed Dec. 20, 1965, now abandoned, there is disclosed a new and improved electroluminescent storage device which involves a display panel comprising a plurality of spaced electrodes on one surface of a supporting substrate, a layer of electroluminescent material overlying the plurality of electrodes and forming a part of the electrical connection between the electrodes, and a layer of a field effect semiconductor material overlying the layer of electroluminescent material and forming a succeeding part of the electrical connection between the electrodes, the panel having a charge retaining surface adapted to store an electrostatic charge pattern thereon. Such a panel is used in combination with means for depositing a charge pattern on the charge retaining surface. In operation, an alternating current voltage is applied between the spaced electrodes which is sufficient to induce electroluminescence when the field effect semiconductor material is at its low impedance state. It was found that the deposition of an electrostatic charge on the charge retaining surface of the display panel can be used to control the flow of current from electrode to electrode. Deposition of electrostatic charge increases the impedance of the field effect semiconductor thereby reducing or interrupting the flow of current in adjacent areas. Reduction of current flow causes a corresponding reduction in light output from the electroluminescent layer resulting in a half-toned response. If the current is lowered below that which is sufficient to induce electroluminescence, luminescence will not occur and that particular portion of the storage device will appear dark. Conversely, the impedance is lowered and current flow increased as the charges are neutralized or removed from the surface. By selectively placing or modifying a charge pattern on the surface of the display panel an image can be produced and stored for long periods of time.

Additional electroluminescent devices are known and have been used to store and intensify input information. Such devices usually comprise contiguous electroluminescent and photoconductive layers sandwiched between transparent electrodes. Electric potential applied between the electrodes is insufficient to cause luminescence of the electroluminescent layer because of the high impedance of the photoconductive layer in the dark. However, if the photoconductive layer is illuminated its impedance will be reduced to a point at which electroluminescence may occur. Selective illumination of certain areas of the photoconductor will produce electroluminescence from selected areas of the electroluminescent layer thus making possible the production and storage of radiant energy images. Such a solid state light amplifier for the color reproduction of radiant energy images is shown by Gebel U.S. 3,005,108. However, as in the case of this device as well as other devices having the contiguous electroluminescent and photoconductive layers sandwiched between transparent electrodes, it is difficult to provide a photoconductive layer of sufficient thickness to have the impedance necessary to control the electroluminescent layer and yet thin enough to be easily penetrated by incident radiation. Furthermore, the devices require electrodes on both sides of the layers which is not desirable.

Therefore, it is an object of this invention to provide a new and improved electroluminescent storage device.

It is a further object of this invention to provide a new and improved electroluminescent device for the production of intensified color images which preserve the color distribution of the original input image.

The above and still further objects, features, and advantages of the present invention will become apparent upon consideration of the following detailed disclosure of specific exemplary embodiments of the invention.

The above and still further objects may be accomplished in accordance with the present invention by providing an electroluminescent display panel comprising a plurality of spaced electrodes on one surface of a supporting substrate, a layer of electroluminescent material overlying the plurality of electrodes, the electroluminescent material layer being sectioned or activated to provide different areas which will emit different colored light, each electrode being in contact with at least two sections or areas which emit different colored light, and a layer of variable impedance material overlying the layer of electroluminescent material; the display panel being used in combination with appropriate means for producing and storing input information upon the electroluminescent display panel.

The nature of the invention will be more easily understood when it is considered in conjunction with the accompanying drawings of exemplary preferred embodiments of the invention wherein.

It should be noted that in the figures the thickness of the layers, electrodes, etc., as well as other dimensions, have been greatly exaggerated to show the details of construction.

Figure 1:
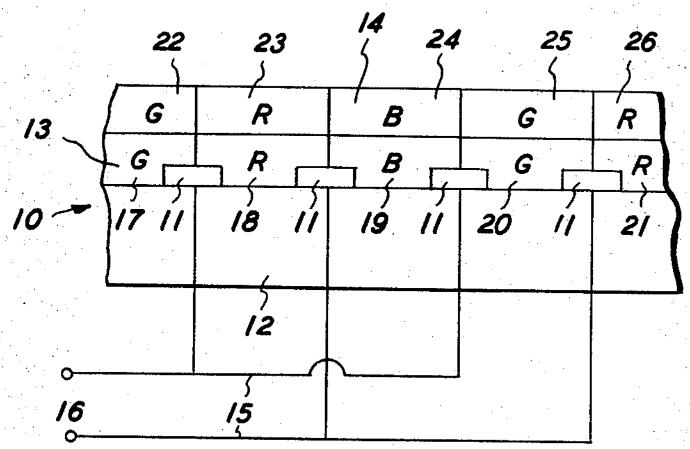
FIG. 1 is an enlarged fragmentary sectional view of an imaging device of the persent invention.

Referring to FIG. 1, the display panel 10 comprises a plurality of spaced electrodes 11 mounted on a supporting substrate 12. Contacting each of the electrodes 11 is an electroluminescent material 13; specifically, the electroluminescent material 13 forms a layer overlying each of said electrodes 11. Electrical connections 15 are made to the electrodes 11 to enable the application of a voltage therebetween. Alternating electrodes are connected to one side of an alternating current voltage source 16 and the intermediate electrodes are connected to the other side of the source. A layer of variable impedance material 14 selected from the group consisting of a field effect semi-conductor material and a photoconductive material is disposed over electroluminescent material 13.

The electroluminescent layer 13 is divided into a plurality of sections 17, 18, 19, 20, and 21. Each section is composed of an electroluminescent phosphor which emits, or is activated to emit, light of the different primary colors. As shown, sections 17 and 20 emit green light, sections 18 and 21 emit red light, and section 19 emits blue light. The sections are situated so that the interface between one section and an adjacent section is at about the midpoint of the electrode 11 which underlies the interface. The sections are interspersed with each other in a predetermined geometrical pattern throughout the viewing area of the display panel. One such pattern consists of alternating sections in groups of three across the viewing area; for example, as shown in FIG. 1, the sequence is green-emitting phosphor, red-emitting phosphor, and blue-emitting phosphor, the sequence being continued in that order over the remainder of the applicable viewing surface. The electroluminescent layer can be formed of any known electroluminescent phosphor which emits the proper light, or can be activated to emit the proper light. For example, zinc sulfide activated copper emits blue light; zinc sulfide activated with copper and manganese emits green light; and a combination of zinc sulfide and mercuric sulfide activated with copper emits red light. The electroluminescent material is preferably mixed with a transparent dielectric binder material, such as epoxy or polyvinyl chloride resin, and any appropriate activators, and then applied, by any known means, over the spaced electrodes so as to provide the sectioned layer as described above.

As a matter of convenience, the electroluminecent material has been shown in the form of a continuous, sectioned layer. However, the electroluminescent material which lies in the spaces between electrodes does not produce substantial electroluminescence during the operation of the device. Consequently, such portions may be replaced by insulating material if desired. Thus, it is necessary that only the electrodes be coated with the electroluminescent material so as to provide the aforesaid sectioned layer.

As previously noted, the variable impedance material can be either a field effect semiconductor material, such as zinc oxide, lead oxide, and cadmium oxide; or a photoconductor, such as cadmium sulfide, cadmium selenide, selenium, and selenium alloys with minor amounts of arsenic or tellurium. The variable impedance material layer 14 is divided into a plurality of sections 22, 23, 24, 25 and 26. Each section is composed of a variable impedance material which is responsive to, or is sensitized to be responsive to, light of the different primary colors. As shown, sections 22, and 25 are responsive to green light, sections 23 and 26 are responsive to red light and section 24 is responsive to blue light. The variable impedance material sections are situated so that the interface between one section and an adjacent section coincides with an extension of the interface between the various sections of the electroluminescent materials underlying the respective variable impedance material sections.

The electroluminescent material and the variable impedance material layers can be applied to the supporting substrate in any known manner. One particular approach is to simultaneously deposit all the electroluminescent phosphor sections which emit the same primary color. This can be done by providing a suitable mask having openings equal to the width of one section (i.e., a distance equal to the length between midpoints of two adjacent electrodes) and having a distance between openings equal to twice the width of the opening. After depositing (for example, by spraying) a first electroluminescent phosphor through the mask the appropriate variable impedance material is deposited on top of the phosphor prior to indexing the mask to a new position. This process is then repeated as described for the two additional primary color phosphor and variable impedance material sections to provide the structure as shown in FIG. 1.

If it is desired to view the display panel from the side opposite the variable impedance material side of the unit, then supporting substrate 12 and spaced electrodes 11 should be transparent. A suitable substrate-electrode combination is optically transparent glass overcoated with thin optically transparent electrodes of tin oxide. The transparent electrodes may be produced by applying tin oxide, produced by the reaction of vapors of stannic acid, water, and methanol, through a suitable mask. In addition to glass as a supporting substrate, it should be noted that clear transparent plastics, such as "Mylar" are also acceptable materials.

If it is desired to view the stored image from the variable impedance material side of the panel, then the variable impedance material should be transparent or translucent. In actuality, because of the thinness of the variable impedance material layer the difference between transparency and translucency is so slight as to be immaterial. In this latter structure, the panel can be fabricated on an opaque insulating base using opaque, for example metallic, electrodes. Suitable translucent variable impedance materials include thin layers of zinc oxide, lead oxide, cadmium oxide, Rochelle salt, etc.

The spaced electrodes employed are merely convenient means for accurately selecting the length and cross-sectional areas of the current path. Thus, by decreasing spacing between adjoining electrodes and/or by increasing the thickness of the variable impedance material layer, one can increase the current therethrough for a given set of conditions. Additionally, the electrodes may have any configuration as long as the modification of the impedance of the variable impedance layer continues to control the current flow between the spaced electrodes.

Figure 3:
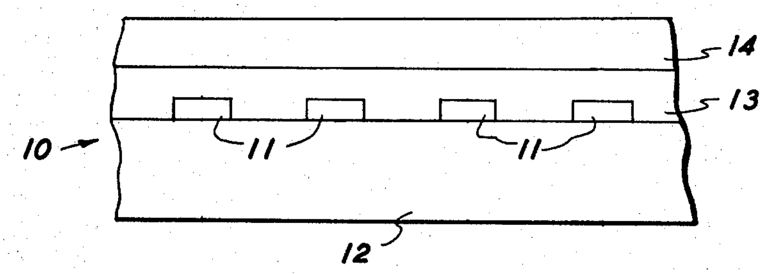
FIG. 3 is an end view of the imaging device of FIG. 2.
Figure 2:
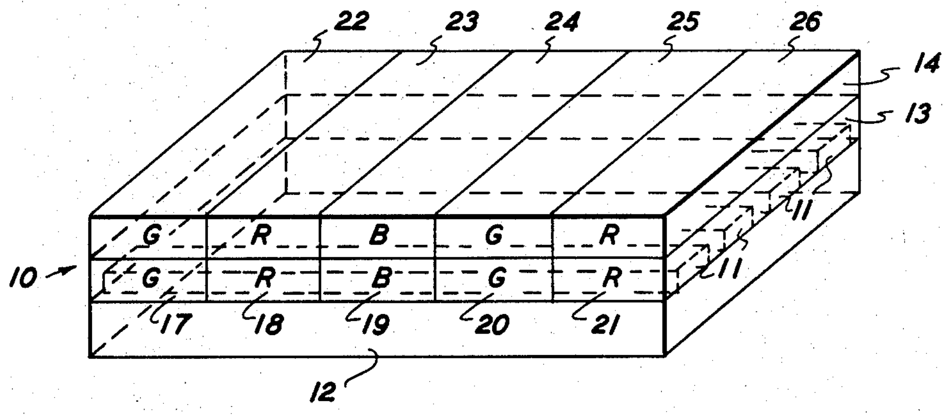
FIG. 2 is an enlarged fragmentary isometric view of another embodiment of the imaging device of the present invention.

FIGS. 2 and 3 represent a modification of FIG. 1 wherein the spaced electrodes are perpendicular to the logitudinal axis of the electroluminescent and variable impedance materials sections. Referring to FIGS. 2 and 3, the display panel 10 comprises a plurality of spaced electrodes 11 mounted on supporting substrate 12. Contacting each of the electrodes 11 is an electroluminescent material 13; specifically, the electroluminescent material 13 forms a layer overlying each of said electrodes 11. The dashed lines show the extension of one spaced electrode through the electroluminescent phosphor layer 13. Appropriate electrical connections (not shown) are made, as in FIG. 1, to the electrodes to enable the application of a voltage therebetween. A layer of variable impedance material 14 is disposed over electroluminescent layer 13. As in FIG. 1, the electroluminescent layer 13 is divided into a plurality of sections 17, 18, 19, 20 and 21 and each section is composed of an electroluminescent phosphor which emits, or is activated to emit, light of the different primary colors. The sections are interspersed with each other in a predetermined geometrical pattern throughout the viewing area of the display panel. The variable impedance material layer 14 is also divided into a plurality of sections 22, 23, 24, 25 and 26. Each section is composed of a variable impedance material which is responsive to, or is activated to be responsive to, light of the different primary colors. The variable impedance material sections are situated so that the interface between one section and an adjacent section coincides with an extension of the interface between the various sections of the electroluminescent material beneath the respective variable impedance material sections. That is, the sections comprising the variable impedance material are the same width as the underlying sections of electroluminescent material and the variable impedance material sections are placed directly on top of an underlying electroluminescent material section. In the preferred embodiment, the variable impedance material sections are responsive to a primary color in the input information which will be emitted by the underlying electroluminescent material section when it is caused to luminesce.

As in all solid state imaging devices, it is essential that the resolution of the display panel not be significantly degraded. In the embodiment of FIG. 1 wherein the phosphor and variable impedance material sections run parallel to the longitudinal axis of the spaced electrodes, three spaced electrodes are required to produce a picture element of variable color. In the embodiment of FIGS. 2 and 3 wherein the phosphor and variable impedance material sections are positioned perpendicular to the longitudinal axis of the spaced electrodes, only two conducting strips are required to produce a picture element of variable color. With such an arrangement, the electrode limitation on resolution is diminished so that very narrow sections of phosphors and variable impedance materials can be used resulting in increased resolution.

In operation of the storage panel wherein a field effect semiconductor material is utilized as the variable impedance material, an alternating current voltage is applied between the spaced electrodes which is sufficient to cause current flow sufficient to induce electroluminescence when the field effect semiconductor is at its low impedance state. The deposition of an electrostatic charge pattern on the charge retaining surface of the electroluminescent panel can be used to control the flow of current from electrode to electrode. Deposition of electrostatic charge increases the impedance of the field effect semiconductor thereby reducing or interrupting the flow of current in adjacent areas. Reduction of current flow will cause a corresponding reduction in light output and if the current is lowered below that which is necessary to induce electroluminescence, no luminescence will occur and that particular portion of the storage device will appear dark. Conversely, the impedance is lowered and current flow increased as the charges are neutralized or removed from the charge retaining surface. Accordingly, by selectively placing a charge pattern on the charge retaining surface an image may be produced and stored upon the display panel.

When it is desired to produce a multi-colored picture on a black background, electrostatic charge is uniformly deposited over the entire applicable surface of the display panel. Neutralizing or removing a portion of the charge will cause current flow in adjacent areas thereby resulting in the luminescence of the underlying electroluminescent layer. A multi-colored picture on a black background can also be obtained by depositing a selected electrostatic charge pattern wherein dark background areas correspond to areas of charge deposition. Luminescence of the phosphor layer beneath those areas of the semiconductor layer where no charge resides will produce a multi-colored output image.

When it is desired to have a black picture on a multi-colored background a selected electrostatic charge pattern is placed on the charge retaining surface. This results in an increase in impedance of the semiconductor thereby interrupting the flow of current in adjacent areas. When current flow falls below the level which is necessary to induce electroluminescence, that portion of the storage device where the charge resides will appear dark, and a black picture on a multi-colored background will be obtained. Alternatively, a uniform electrostatic charge can be applied to the charge retaining surface and then a portion of the charge corresponding to the multi-colored background areas can be removed or neutralized to produce the desired result.

So far the operation of the display panel has been discussed broadly without regard to the exact nature of the input image. Under the aforementioned conditions it would not be absolutely necessary that the output image correspond directly to the input image. This is because the deposition of the electrostatic charge and the subsequent neutralization and/or removal thereof can be rone without regard to a particular input image.

To obtain an intensified multi-colored output image of a particular input image wherein the original color distribution is maintained, a uniform electrostatic charge is placed upon the charge retaining surface and then the display panel is optically subjected to the multi-colored input image. The light of a particular primary color from the input image striking that portion of the field effect semiconductor sensitive to that particular color will have the charge neutralized and/or removed in relation to the intensity of the input image. Current will then flow through the phosphor layer and intensified light of the same color will be emitted thererfom. Light of a particular primary color striking a portion of the field effect semiconductor which is not responsive to that color will have no effect on the deposited charge; accordingly, the output image will appear dark in that particular elemental area unless other light to which it is sensitive has impinged thereon. In this manner, an intensified multi-colored output image corresponding to the original multi-colored input image can be produced for viewing purposes, etc.

In the preferred embodiment, the field effect semiconductor also has photoconductive insulating properties. A particularly suitable field effect semiconductor which meets all of the aforementioned requirements is zinc oxide, and it can be sensitized to be responsive to various portions of the electromagnetic spectrum. A uniform electrostatic charge can be deposited by any known means, including corona discharge. Selected dissipation of a portion of the stored charge pattern is achieved by exposing the display panel to sensitizing light. The electrostatic charge will be dissipated in those elemental areas where the radiant energy excitation of a particular primary color impinges upon an elemental area which is responsive to that particular primary color. Dissipation of the electrostatic charge results in the lowering of the impedance of the semiconductor material which, in turn, causes current to flow through the electroluminescent phosphor and variable impedance material layers thereby yielding an intensified multi-colored output image corresponding to the original color distribution in the input image.

As previously indicated, a uniform electrostatic charge can be deposited on the charge retaining surface and then a portion thereof removed to give the selected charge pattern or, in the alternative, the selected charge pattern can be deposited initially. For a complete description of the manner and means for creating a charge pattern on the charge retaining surface of the display panel, reference is made to Ser. No. 582,856 filed Sept. 29, 1966, which is incorporated herein by reference.

A photoconductor can also be utilized as the variable impedance material layer of the display panel. When such a material is utilized, it is not necessary to employ an electrostatic charge pattern to control the current flow through the device. Rather, it is the decrease of the impedance of the photoconductor layer caused by the radiant energy excitation which controls image production and storage. In operation, an alternating current voltage is applied between the electrodes which is insufficient to cause enough current flow to produce electroluminescence of the phosphor layer. The stored image is produced by increasing the conductivity of the photoconductive material by exposing that layer to incident radiation. The reduction of impedance of the photoconductive material permits additional current flow which is sufficient to cause luminescence of the adjoining portions of the electroluminescent material. As previously described, the photoconductive material is partitioned to provide sections each of which is responsive to a different primary color. To obtain a corresponding intensified output image it is necessary that a primary color beam of light from the input image impinge upon an elemental area of the photoconductor which is sensitive to that particular light. The conductivity of that material is increased with a corresponding reduction of the impedance. Current flows between the spaced electrodes through the underlying phosphor which emits the apprnopriate primary-colored light. In this manner, an intensified output image corresponding to the original color distribution of the input image is produced and stored upon the display panel.

Figure 4:
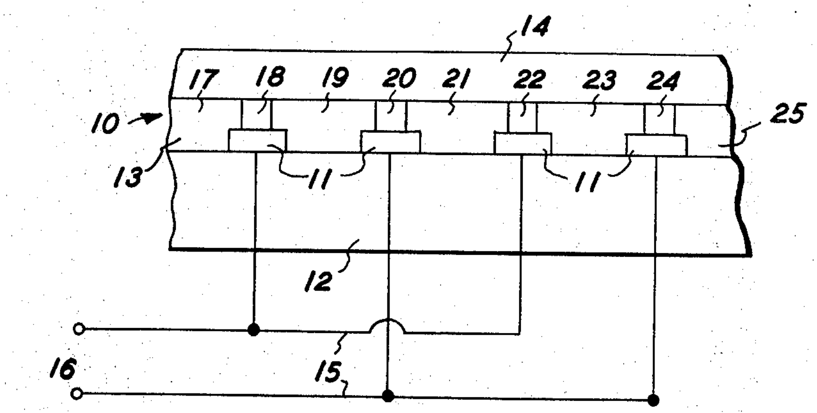
FIG. 4 is an enlarged fragmentary sectional view of still a further imaging device of the present invention.

Referring to FIG. 4, there is shown a further embodiment of the present invention wherein the display panel 10 comprises a plurality of spaced electrodes 11 mounted on supporting substrate 12. Contacting each of the electrodes 11 is a layer of electroluminescent material 13. Electrical connections 15 are made to the electrodes 11 to enable the application of a voltage therebetween. Alternating electrodes are connected to one side of an alternating current voltage source 16 and the intermediate electrodes are connected to the other side of the source. A layer of unsensitized variable impedance material 14 selected from the group consisting of a field effect semiconductor material and a photoconductive material is disposed over electroluminescent material 13.

The electroluminescent layer 13 is divided into a plurality of sections 17, 18, 19, 20, 21, 22, 23, 24 and 25. Each section is composed of an electroluminescent phosphor which emits, or is activated to emit, light of a color which other in a predetermined geometrical pattern through the has high contrast with the light emitted by the adjacent phosphor sections. The sections are interspersed with each other in a predetermined geometrical pattern through the viewing area of the display panel. The sections are positioned so that each of the same color emitting phosphors are located over a corresponding spaced electrode but the width is such that the section covers only a portion of the surface of the spaced electrode. For example, as shown, sections 17, 19, 21, 23, and 25 can be blue-emitting phosphor sections and sections 18, 20, 22, and 24 can be yellow-emitting phosphor sections. Each of the sections 18, 20, 22, and 24 is positioned over a corresponding spaced electrode 11 so that only a portion of the surface of the electrode is covered. At least the edge portions of the spaced electrodes must be contacted by the other color-emitting sections 17, 19, 21 23 and 25 though it is possible to have substantial portions (e.g. 50%) of the upper surface of the electrodes covered by such phosphor sections.

The display panel as described in FIG. 4 can be used to convert a weak input image into a high contrast output image wherein the color varies with the intensity of the input light. In operation, if a weak input image falls on an element of the display panel, only the phosphor in the neighborhood of the edges of the conducting strips will emit light. If the input light striking the variable impedance material layer above an element is intense, the phosphor at the middle of the spaced electrodes will also light up so that a combination of colors will be emitted. In this manner, the display panels can be used to provide an output color which is indicative of a particular input signal level.

The following example is given to enable those skilled in the art to more clearly understand and practice the invention. It should not be considered as a limitation upon the scope of the invention but merely as being illustrative thereof.

A glass plate about 12" long and about 12" wide and 3/16" thick has a grid of transparent NESA glass conducting electrode strips formed thereon. Each NESA electrode strip extends the width of the plate and has a width of about 10 mils. The electrode strips are mounted parallel to each other with a uniform spacing of about 10 mils. Alternate connecting electrodes are connected to one side of an alternating current voltage source with the intermediate conducting electrodes connected to the other side of the voltage source. A mask having rectangular openings 10 mils wide extending the width of the glass plate is placed over the deposited electrode strips. The distance between openings is 20 mils. The mask is positioned so that any material deposited therethrough will be perpendicular to the longitudinal axis of the electrode strips. A red-emitting phosphor comprising zinc sulfide and mercuric sulfide activated with copper in an epoxy resin binder is deposited through the mask to a thickness of about 2 mils. Prior to indexing the mask, a zinc oxide field effect semiconductor layer which is sensitive to red light is deposited over the phosphor layer. The zinc oxide layer is 1 mil thick. The mask is indexed 10 mils and a blue-emitting phosphor comprising zinc sulfide activated with copper is deposited. Thereafter, a blue responsive zinc oxide layer is deposited over the phosphor. The mask is then indexed 10 mils a second time and a green emitting phosphor comprising zinc sulfide activated with copper and manganese is deposited. A green responsive zinc oxide material is coated over the phosphor. An alternating current voltage which is sufficient to induce electroluminescence of the phosphor layer when the field effect semiconductor material is at its low impedance state is applied between the spaced electrodes. A uniform electrostatic charge is disposed over the charge retaining surface causing complete termination of the emitted light. The zinc oxide layer is subjected to a multicolored input image resulting in a greatly intensified output image on the opposite side of the display panel. Areas which are not exposed to any input radiant energy excitation remain dark but the output image has the same color distribution as the input image. The input image remains stored upon the device for a substantial period of time after termination of the input signal.

In certain applications, it may be desired to provide a layer of opaque insulating material positioned between the electroluminescent material and the variable impedance material. The opaque insulating material is formed, for example, of lamp-black in a suitable binder and sprayed onto the electroluminescent material. When used, the opaque layer prevents light feed-back from the electroluminescent material to the variable impedance material should the latter material also be a photoconductor which is responsive to the light emitted during luminescence. Additionally, a thin opaque barrier can be placed between adjacent electroluminescent sections to prevent cross illumination by adjacent phosphor sections.

Filters or filter strips can be appropriately placed to modify either the input radiant energy excitation or the output which is derived from operation of the display panel. For example, filters can be placed on the input side of the display panel to cut out either high level or low level input, as is desired. This will aid in detecting a particular input signal level. Filters can be placed over the variable impedance material layer so that the latter material layer will be responsive, or non-responsive, to a particular input signal. Additionally, filters can be placed over the output side of the panel to modify the output signal obtained. It would of course be possible to completely eliminate certain portions of the output signal thereby providing means for obtaining color separations of the original input image.

While the invention has been described with reference to preferred embodiments thereof, it will be understood by those skilled in the art that various changes in form and details may be made without departing from the true spirit and scope of the invention. It should be understood that the present invention is not dependent upon the exact nature of the electroluminescent materials or the variable impedance materials employed, rather any suitable material or structure can be employed, provided the advantageous results of this invention are not adversely affected.

All substitutions, additions, and modifications to which the present invention is readily susceptible, without departing from the spirit and scope of this disclosure, are considered part of the present invention.

What is claimed is:

1. An electroluminescent panel comprising a supporting substrate, a plurality of spaced electrodes disposed on one surface of said supporting substrate, said electrodes being the only electrodes associated with said panel, said electrodes including a first electrode, at least one intermediate electrode and a last electrode, a layer of electroluminescent material overlying said plurality of electrodes, and a layer of variable impedance material overlying said electroluminescent material, said electroluminescent material layer comprising a plurality of distinct sections each of which emits primary radiation corresponding to only a portion of the wavelengths in the electromagnetic radiant energy spectrum, and each of said intermediate electrodes being in contact with at least two different radiation-emitting sections of electroluminescent material.

2. The electroluminescent panel of claim 1 wherein said electroluminescent material comprises a plurality of groups of three sections with each section in each of said groups comprising a different primary color light-emitting phosphor.

3. The electroluminescent panel of claim 1 wherein each of said intermediate electrodes is in contact with two distinct sections of electroluminescent material.

4. The electroluminescent panel of claim 1 wherein each of said intermediate electrodes is in contact with three distinct sections of electroluminescent material.

5. The electroluminescent panel of claim 1 wherein said sections of electroluminescent material extend from about the midpoint of one of said electrodes to about the midpoint of an adjacent electrode.

6. The electroluminescent panel of claim 1 wherein said variable impedance material is a photoconductor having an exposed radiation-receiving surface.

7. The electroluminescent panel of claim 1 wherein said variable impedance material is a photoconductor having an exposed radiation-receiving surface; said panel further including a potential source, means connected to said potential source and said electrodes for applying potential to said electrodes, alternate electrodes being connected to opposite sides of said potential source, and means for projecting a multi-colored input image onto said exposed surface of said photoconductor whereby an output image corresponding to said input image is obtained.

8. The electroluminescent panel of claim 1 wherein said variable impedance material is a field-effect semiconductor having contiguous thereto an exposed charge-retaining surface suitable for the deposition and retention of electrostatic charge thereon; said panel further including a potential source, means connected to said potential source and said electrodes for applying potential to said electrodes, alternate electrodes being connected to opposite sides of said potential source, and means for forming an electrostatic charge pattern on said exposed charge-retaining surface, said electrostatic charge pattern being adapted to regulate the flow of current between said electrodes, whereby an output image corresponding to a particular input image can be stored on said panel.

9. The electroluminescent panel of claim 8 wherein said field-effect semiconductor is zinc oxide.

10. The electroluminescent panel of claim 1 wherein said variable impedance material is a field-effect semiconductor, said field-effect semiconductor having an exposed surface substantially parallel to the interface between said field-effect semiconductor layer and said electroluminescent material layer, said field-effect semiconductor capable of retaining an electrostatic charge on said exposed surface and conducting current through the body portion thereof without substantially affecting the electrostatic charge on said exposed surface.

11. The electroluminescent panel of claim 1 wherein said variable impedance material comprises a field-effect semiconductor layer sandwiched between an overlying photoconductive insulating layer and said electroluminescent material layer, said photoconductive insulating material having an exposed surface substantially parallel to the interface between said field-effect semiconductor layer and said electroluminescent layer, said exposed surface being suitable for the deposition and retention of electrostatic charge thereon.

12. The electroluminescent panel of claim 1 wherein said variable impedance material is a field-effect semiconductor having photoconductive insulating properties, said field-effect semiconductor having an exposed surface substantially parallel to the interface between said field-effect semiconductor layer and said electroluminescent material layer, said exposed surface being suitable for the deposition and retention of electrostatic charge thereon.

13. An electroluminescent panel comprising a supporting substrate, a plurality of spaced electrodes disposed on one surface of said supporting substrate, said electrodes being the only electrodes associated with said panel, a layer of electroluminescent material overlying said electrodes, said electroluminescent material layer comprising a plurality of distinct sections each of which emits primary radiation corresponding to only a portion of the wavelengths in the electromagnetic radiant energy spectrum, each section of electroluminescent material extending from about the midpoint of one of said electrodes to about the midpoint of an adjacent electrode, and a layer of variable impedance material overlying said electroluminescent material layer, said variable impedance material layer comprising a plurality of distinct sections, each of said variable impedance material sections being of the same width as an underlying electroluminescent material section and lying directly over said underlying electroluminescent material section such that the interface between adjacent variable impedance material sections coincides with an extension of the interface between adjacent electroluminescent material sections, and each variable impedance material section being responsive substantially only to that portion of the wavelengths in the electromagnetic radiant energy spectrum emitted by an underlying electroluminescent material section.

14. The electroluminescent panel of claim 13 wherein said variable impedance material is a photoconductor having an exposed radiation-receiving surface; said panel further including a potential source, means connected to said potential source and said electrodes for applying potential to said electrodes, alternate electrodes being connected to opposite sides of said potential source, and means for projecting a multi-colored input image onto said exposed surface of said photoconductor whereby an output image corresponding to said input image is obtained.

15. The electroluminescent panel of claim 13 wherein said variable impedance material is a field-effect semiconductor having contiguous thereto an exposed charge-retaining surface suitable for the deposition and retention of electrostatic charge thereon; said panel further including a potential source, means connected to said potential source and said electrodes for applying potential to said electrodes, alternate electrodes being connected to opposite sides of said potential source, and means for forming an electrostatic charge pattern on said exposed charge-retaining surface, said electrostatic charge pattern being adapted to regulate the flow of current between said electrodes, whereby an output image corresponding to a particular input image can be stored on said panel.

16. The electroluminescent panel of claim 15 wherein said field-effect semiconductor is zinc oxide.

17. An electroluminescent panel comprising a supporting substrate, a plurality of parallel spaced electrodes disposed on one surface of said supporting substrate, said electrodes being the only electrodes associated with said panel, a layer of electroluminescent material overlying said electrodes, said electroluminescent material comprising a plurality of distinct sections each of which emits electromagnetic radiation corresponding to only a portion of the wavelengths in the electromagnetic radiant energy spectrum, the longitudinal axis of said electroluminescent material sections being perpendicular to the longitudinal axes of said electrodes, and a layer of variable impedance material overlying said electroluminescent material, said variable impedance material comprising a plurality of distinct sections each of which is responsive only to that portion of the wavelengths in the electromagnetic radiant energy spectrum corresponding to the wavelengths emitted by an underlying electroluminescent material section, each of said variable impedance material sections being of the same width as an underlying electroluminescent material section with the interface between adjacent variable impedance material sections coinciding with an extension of the interface between adjacent electroluminescent material sections.

18. The electroluminescent panel of claim 17 wherein said variable impedance material is a photoconductor having an exposed radiation-receiving surface; said panel further including a potential source, means connected to said potential source and said electrodes for applying potential to said electrodes, alternate electrodes being connected to opposite sides of said potential source, and means for projecting a multi-colored input image onto said exposed surface of said photoconductor whereby an output image corresponding to said input image is obtained.

19. The electroluminescent panel of claim 17 wherein said variable impedance material is a field-effect semiconductor having contiguous thereto an exposed charge-retaining surface suitable for the deposition and retention of electrostatic charge thereon; said panel further including a potential source, means connected to said potential source and said electrodes for applying potential to said electrodes, alternate electrodes being connected to opposite sides of said potential source, and means for forming an electrostatic charge pattern on said exposed charge-retaining surface, said electrostatic charge pattern being adapted to regulate the flow of current between said electrodes, whereby an output image corresponding to a particular input image can be stored on said panel.

20. The electroluminescent panel of claim 19 wherein said field-effect semiconductor is zinc oxide.

21. An electroluminescent panel comprising a supporting substrate, a plurality of spaced electrodes disposed on one surface of said supporting substrate, said electrodes being the only electrodes associated with said panel, a layer of electroluminescent material overlying said electrodes, said electroluminescent material comprising a plurality of distinct sections each of which emits electromagnetic radiation corresponding to only a portion of the wavelengths in the electromagnetic radiant energy spectrum; each electrode having wholly disposed on the upper surface thereof at least one electroluminescent section which extends less than the entire width of said electrode; said electrode also being in contact with at least one further different radiation-emitting section of electroluminescent material; and a layer of variable impedance material overlying said electroluminescent material layer.

22. The electroluminescent panel of claim 21 wherein said variable impedance material is a photoconductor having an exposed radiation-receiving surface; said panel further including a potential source, means connected to said potential source and said electrodes for applying potential to said electrodes, alternate electrodes being connected to opposite sides of said potential source, and means for projecting a multi-colored input image onto said exposed surface of said photoconductor whereby an output image corresponding to said input image is obtained.

23. The electroluminescent panel of claim 21 wherein said variable impedance material is a field-effect semiconductor having contiguous thereto an exposed charge-retaining surface suitable for the deposition and retention of electrostatic charge thereon; said panel further including a potential source, means connected to said potential source and said electrodes for applying potential to said electrodes, alternate electrodes being connected to opposite sides of said potential source, and means for forming an electrostatic charge pattern on said exposed charge-retaining surface, said electrostatic charge pattern being adapted to regulate the flow of current between said electrodes, whereby an output image corresponding to a particular input image can be stored on said panel.

24. The electroluminescent panel of claim 23 wherein said field-effect semiconductor is zinc oxide.

References Cited

UNITED STATES PATENTS

| | | | |
|---|---|---|---|
| 2,905,830 | 9/1959 | Kazan | 250—213 |
| 2,976,447 | 3/1961 | McNaney | 313—108 |
| 3,005,108 | 10/1961 | Gebel | 250—213 |
| 3,042,834 | 7/1962 | Nicoll | 250—213 |
| 3,247,389 | 4/1966 | Kazan | 313—65 X |
| 3,441,736 | 9/1966 | Kazan et al. | 250—213 |

WALTER STOLWEIN, Primary Examiner

U.S. Cl. X.R.

178—5.4; 340—173